May 14, 1929.  J. G. ROUNTREE  1,713,397
COTTON HARVESTING MACHINE
Filed June 16, 1927   3 Sheets-Sheet 3
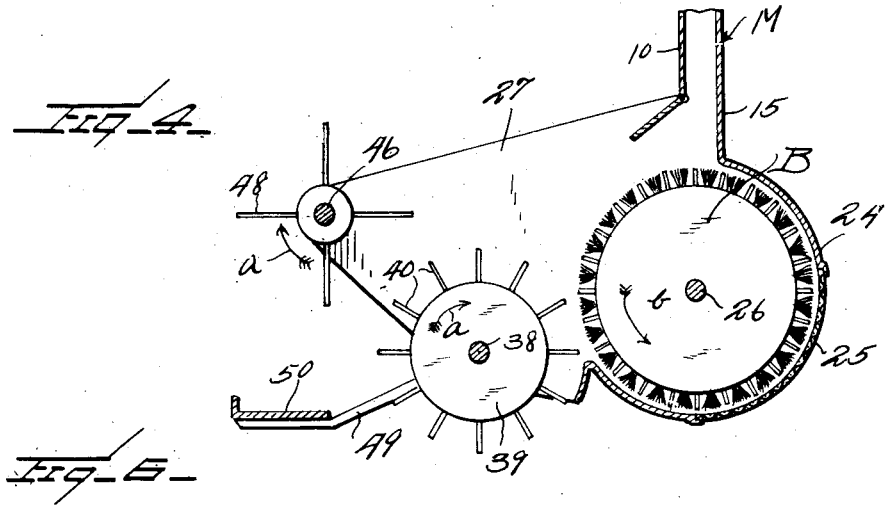
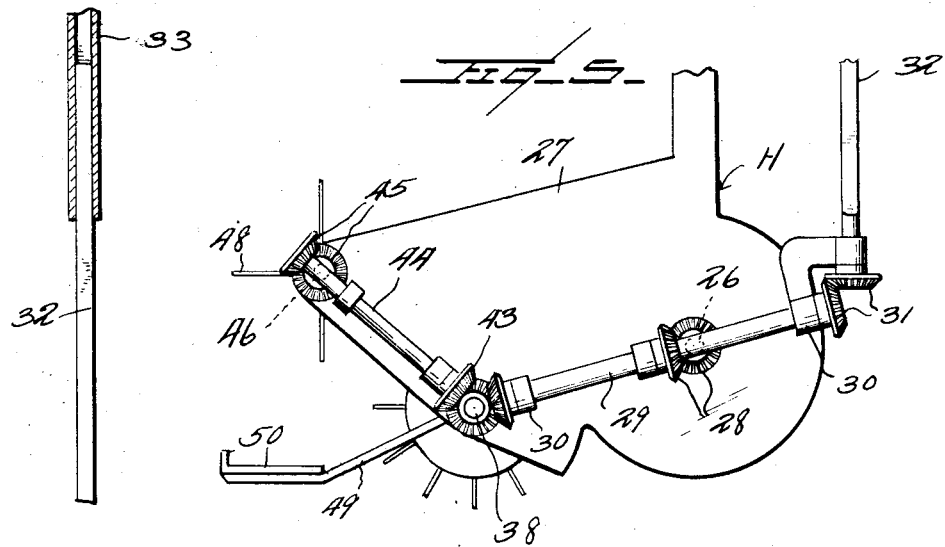
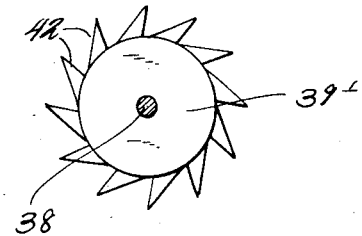
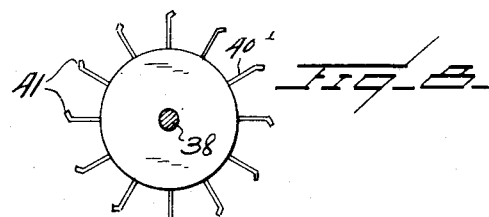
INVENTOR.
J. G. Rountree
Watson E. Coleman
ATTORNEY.

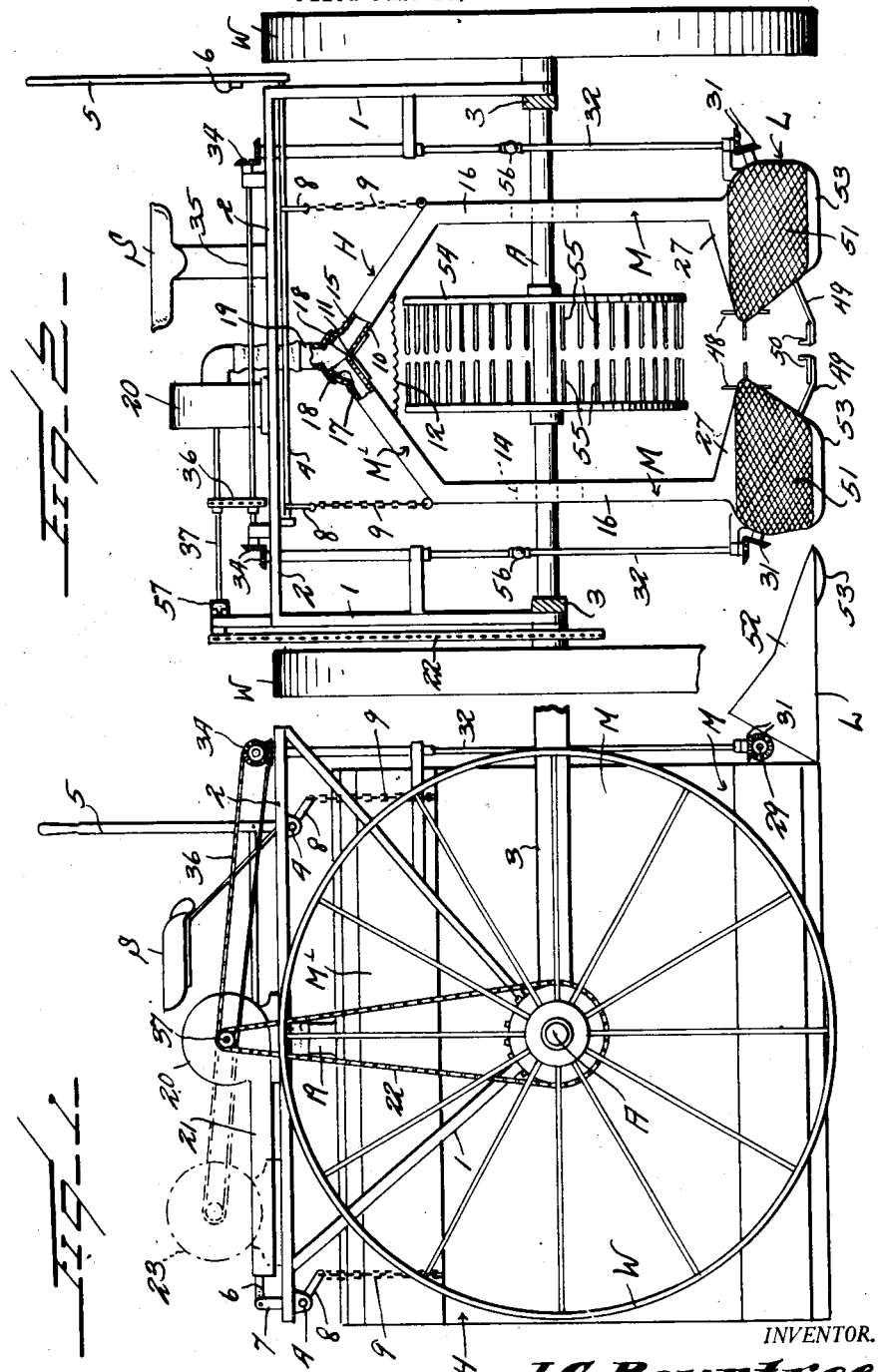

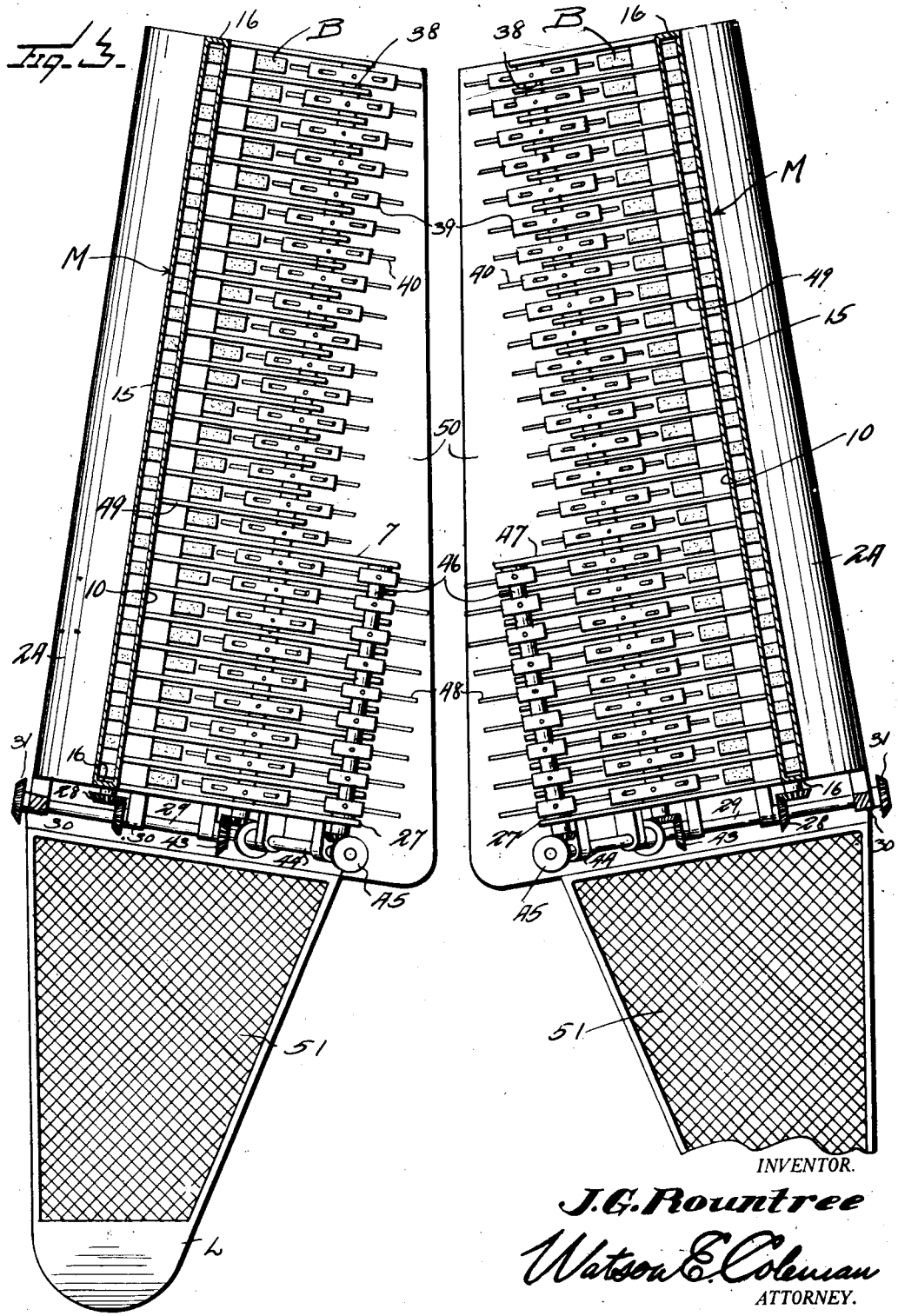

Patented May 14, 1929.

1,713,397

UNITED STATES PATENT OFFICE.

JOSEPH G. ROUNTREE, OF BEEVILLE, TEXAS.

COTTON-HARVESTING MACHINE.

Application filed June 16, 1927. Serial No. 199,324.

This invention relates to cotton harvesting machines and it is an object of the invention to provide a machine of this kind which is adapted to travel over a plant row and during such travel to effectively gather or collect the bolls and cotton carried thereby.

It is also an object of the invention to provide a device of this kind provided with pan-like members adapted to travel along opposite sides of a plant row and to underlie the foliage thereof together with means operating to sufficiently agitate the foliage of the plants to dislodge the bolls for collection in the pan-like members.

An additional object of the invention is to provide a machine of this kind provided with means whereby cotton which may be upon the ground will be readily harvested.

The invention also has for an object to provide a machine of this kind comprising a housing adapted to straddle a plant row from above and which is provided with means for harvesting the cotton together with pneumatic means for conveying the harvested cotton as desired.

A still further object of the invention is to provide a machine of this kind provided with means moving along the ground when the machine is in transit and at opposite sides of the plant row to raise or elevate such foliage as may be drooping or in contact with the ground.

The invention also has for an object to provide a machine of this kind with means whereby the upper portion of the foliage of the plant row is effectively agitated to dislodge the bolls therefrom together with additional means for agitating the lower portion of the foliage of the plant row for the same purpose.

The invention consists in the details of construction and in the combination and arrangement of the several parts of my improved cotton harvesting machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a harvesting machine constructed in accordance with an embodiment of my invention;

Figure 2 is a view in front elevation of the machine as herein disclosed;

Figure 3 is an enlarged horizontal sectional view taken through the lower portion of the machine and illustrating in detail the lower agitating members, the gathering wheels and parts directly associated therewith;

Figure 4 is an enlarged detailed vertical sectional view illustrating the mounting of the concomitant parts at one side of the machine;

Figure 5 is a fragmentary view in end elevation of the structure as illustrated in Figure 4 showing means for operating the various rotatable members;

Figure 6 is a fragmentary view partly in section and partly in elevation of one of the sets of telescoping shaft members herein embodied;

Figure 7 is a view partly in section and partly in elevation illustrating a slightly modified form of gathering member;

Figure 8 is a view similar to Figure 7 disclosing a still further modified form of gathering member.

As disclosed in the accompanying drawings, A denotes an axle having mounted on the opposite end portions thereof the ground engaging wheels W of desired diameters. The axle A also supports at a predetermined point thereabove through the medium of the sidebrace members 1 a table or platform 2. Also operatively engaged with the axle A is a draft rigging 3 whereby the machine in its entirety may be drawn by animals or, if preferred, by a tractor.

Rotatably supported by the table or platform 2 at suitable points fore and aft of the axle A are the rock shafts 4. The forward rock shaft 4 is provided with an upstanding operating lever 5 which is operatively connected through the rod 6 with an upstanding rock arm 7 carried by the rear shaft 4 whereby both of the shafts 4 are caused to rock in unison and in the same general direction upon required manipulation of the lever 5.

The shafts 4 at desired points spaced lengthwise thereof are provided with the rock arms 8 disposed in a direction to be substantially in parallelism at all times and secured to and depending from the outer extremities of the arms 8 are the chains 9 or other flexible members which in turn are secured to the top corner portions of a hood H. By this mounting of the hood H it will be noted that the same may be readily and conveniently raised by an occupant of the seat S through the medium of the lever 5.

The hood H is adapted to straddle a plant row from above and the opposite ends thereof are open. The hood comprises two sections each including a double walled side member M having its upper marginal portion upwardly and inwardly inclined, as at M', on a predetermined angle. The inner or lower walls 10 of the inclined portion M' have their upper marginal portions hingedly connected, as at 11, thus permitting the side members M to have relative movement in a direction lateral of the path of travel of the machine. The members M are normally maintained at the limit of inward movement through the medium of a suitably positioned retractile member or coil spring 12 interposed between and suitably anchored to the inclined portions M'. Each of the members M is provided at a desired location thereon with a relatively large opening 14 through which the axle A is disposed, the diameter of the opening 14 being such to permit the requisite relative movements of the members M without hindrance or obstruction being offered by the axle A.

The space between the walls 10 and 15 of each of the members M is closed by the end walls 16 but open at the bottom and the upper adjacent marginal portions of the outer walls 15 are provided with the upstanding rounded portions 17 with which is operatively engaged a ridge strip 18. This ridge strip 18 at substantially its center is provided with an upstanding spout 19 leading to a suction fan 20. This fan 20 is provided with a carry-off spout 21 adapted to discharge within a suitable container or otherwise as may be preferred.

The fan 20 is mounted upon the table or platform 2 and, as indicated by full lines in Figures 1 and 2, may be driven by the chain 22 or the like from a wheel W.

The lower portion of each of the outer walls 15 is formed to provide a substantially cylindrical chamber 24 extending entirely therealong, a portion of the wall of such chamber being provided with a screening element 25 through which dirt is adapted to be expelled under the action of the brush B. The brush B is mounted upon a shaft 26 rotatably supported by the inwardly disposed end frames or plates 27 carried by each member M. This shaft 26 is in driven connection, as at 28, with a shaft 29 rotatably supported by the bearings 30 carried by an adjacent end frame or plate 27. This shaft 29 is also operatively engaged, as at 31, with an upstanding shaft section 32 telescopically engaged within an upper shaft section 33, said sections 32 and 33 being connected for rotation one with the other but capable of relative longitudinal movement in order to compensate for various inequalities in the surface of the ground over which the machine may travel. These shaft sections 32 and 33 are rotatably supported by a brace member 1 and the table or platform 2 and the upper portion of the shaft section 33 is operatively connected, as at 34, with a shaft 35 rotatably mounted upon the table or platform 2. This shaft 35 is in driven connection, as at 36, with the drive shaft 37 of the fan hereinbefore referred to.

Rotatably supported by the end frames or plates 27 of each of the members M in advance of the shaft 26 and brush B thereon is a shaft 38 on which is mounted for rotation therewith the discs 39, adjacent discs being suitably spaced. Radiating from each of the discs 39 are the picker fingers or teeth 40 shown as substantially straight although, as illustrated in Figure 8, the outer extremities of these fingers or teeth 40' may be angularly disposed, as at 41, to facilitate their function. There also can be employed, if desired, the saw-like teeth 42 extending outwardly from a disc 39' as indicated in Figure 7 of the drawings.

The shaft 38 is operatively engaged, as at 43, with a second shaft 44 carried by an adjacent end frame or plate 27 and extending upwardly and outwardly with respect to the shaft 38. This shaft 44 is also operatively connected, as at 45, with a shaft 46 rotatably supported by the forward plate or frame 27 and by a supplemental frame or plate 47 carried by each member M at a desired point inwardly of the forward frame or plate 27. This shaft 46 at predetermined points therealong is provided with the outstanding beating or agitating members 48 possessing a certain degree of flexibility in order to permit the same to function to the best advantage when brought into contact with the foliage in a plant row with which my improved harvester is being employed. The shafts 38 and 46 rotate in the same direction as indicated by the arrows $a$, thus causing the beaters 48 to strike the foliage from below while the rotation of the shaft 38 causes the fingers or teeth 40 to effectively pick up the cotton bolls dislodged from the foliage and carry the same to the adjacent brush B which rotates in the direction indicated by the arrow $b$. The brush carries the cotton to the lower open space between the walls 10 and 15 of a member M whereby the suction created by the fan 20 carries such cotton upwardly between the walls of the member and out through the carry-off spout 21.

The members M and the upper portions M' thereof are disposed from the front to the rear in converging relation but supported by the ribs 49 extending inwardly and downwardly from each member M and over the adjacent shaft 38 is a collecting pan 50. The two pans 50 are substantially in parallelism but spaced apart a distance sufficient to readily permit the stalks of the cotton plants to pass therebetween when the machine is in transit. These pans 50 closely approach the ground and receive the major portion of the cotton bolls as dislodged from the plants and as the machine advances the foliage of the plants themselves serves as a means to carry such collected bolls with the cotton rearwardly of the pans so as to bring the same into requisite engagement with the fingers or teeth 40, 40' or 42.

Connected in any desired manner with the forward end frame or plate 27 of each of the members M is a lifting element L. This element L comprises a top plate or wall 51, preferably of screen fabric, supported upon desired upward and inward incline by the side plates 52 and the forward portions of the side plates 52 of each of the elements L carries an underlying shoe 53 adapted to have direct contact with or travel on the ground surface.

The elements L operate effectually to lift such foliage in a plant row which may be in contact with the ground, thus assuring a more complete harvesting.

The axle A between the members M of the hood H carries the spaced elongated members 54 provided with the inwardly disposed fingers or teeth 55 also possessing a requisite degree of flexibility. As the machine passes along a plant row these fingers or teeth 55 are adapted to come into contact from above with the plants to effectively agitate the same to dislodge the bolls and cotton therefrom. It it to be understood that the axle A in practice is positioned a sufficient distance above the ground surface to pass over the cotton plants.

I also find it of advantage to interpose in each of the shaft sections 32 a flexible joint 56 in order to more effectively compensate for the movement of the hood H or more particularly the members M thereof when the machine is in operation.

Interposed in the shaft 37 is a suitable clutch mechanism, generally indicated at 57, whereby when desired the various movable parts of my machine may be rendered inoperative. It is to be understood, however, that I do not wish to limit myself to this particular location of the clutch mechanism as the same may with equal facility be employed at other points preferred.

While I have particularly defined my machine for the purpose of harvesting cotton I do not wish to be understood as limiting myself to this particular usage as, for example, it may be employed with advantage in dislodging boll weevils or other insects from the plants during their growth and also to remove from the cotton plants punctured bolls and squares.

From the foregoing description it is thought to be obvious that a cotton harvesting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A harvesting machine of the class described comprising a portable body, a hood supported by the body for travel over a plant row, plant agitating means operating within the hood, gathering means carried by the lower portion of the hood along opposite sides thereof, said hood being open at its opposite ends and having its side members formed by double walls providing a space between such walls, the ends of each of said side members being closed with the bottoms open, and means for creating a suction upwardly through the spaces in the side members.

2. A harvesting machine of the class described comprising a portable body, a hood supported by the body for travel over a plant row, plant agitating means operating within the hood, and gathering means carried by the lower portion of the hood along opposite sides thereof, said hood comprising two sections connected for relative swinging movement in a direction lateral of the path of travel of the machine.

3. A harvesting machine of the class described comprising a portable body, a hood supported by the body for travel over a plant row, plant agitating means operating within the hood, gathering means carried by the lower portion of the hood along opposite sides thereof, said hood comprising two sections connected for relative swinging movement in a direction lateral of the path of travel of the machine, and means for urging said sections of the hood one toward the other.

4. A machine of the class described comprising a portable body, a hood carried thereby and adapted to travel over a plant row, the sides of the hood embodying spaced walls, means for creating a suction upwardly between said spaced walls, end members extending inwardly of the hood at opposite ends thereof, rotary gathering members positioned between the end members and rotatably supported thereby, said gathering members working at opposite sides of a plant row, rotating brushes supported by said end members rearwardly of the gathering members, and means for rotating the gathering members and brushes.

5. A machine of the class described comprising a portable body, a hood carried thereby and adapted to travel over a plant row, the sides of the hood embodying spaced walls, means for creating a suction upwardly between said spaced walls, end members extending inwardly of the hood at opposite ends thereof, rotary gathering members positioned between the end members and rotatably supported thereby, said gathering members working at opposite sides of a plant row, rotating brushes supported by said end members rearwardly of the gathering members, means for rotating the gathering members and brushes, rotating agitating members supported by said end members and positioned above the rotating gathering members, and means for operating said rotating agitating members.

6. A machine of the class described comprising a portable body, a hood carried thereby and adapted to travel over a plant row, the sides of the hood embodying spaced walls, means for creating a suction upwardly between said spaced walls, end members extending inwardly of the hood at opposite ends thereof, rotary gathering members positioned between the end members and rotatably supported thereby, said gathering members working at opposite sides of a plant row, rotating brushes supported by said end members rearwardly of the gathering members, means for rotating the gathering members and brushes, rotating agitating members supported by said end members and positioned above the rotating gathering members, means for operating said rotating agitating members, and pans supported by the hood below the agitating members.

7. A machine of the class described comprising a portable body, a hood carried thereby and adapted to travel over a plant row, the sides of the hood embodying spaced walls, means for creating a suction upwardly between said walls, the lower portion of outer wall of each side being formed to provide substantially a cylindrical chamber, a rotating brush element arranged with and extending along said chamber, means for rotating the element, and gathering means coacting with the brushing element.

8. A machine of the class described comprising a portable body, a hood carried thereby and adapted to travel over a plant row, the sides of the hood embodying spaced walls, means for creating a suction upwardly between said walls, the lower portion of outer wall of each side being formed to provide substantially a cylindrical chamber, a rotating brush element arranged with and extending along said chamber, means for rotating the element, and gathering means coacting with the brushing element, a portion of the wall of the chamber constituting a screening element.

In testimony whereof I hereunto affix my signature.

JOSEPH G. ROUNTREE.